United States Patent
Behaghel et al.

(10) Patent No.: US 8,186,144 B2
(45) Date of Patent: May 29, 2012

(54) COMPONENT VENTILATION AND PRESSURIZATION IN A TURBOMACHINE

(75) Inventors: Laurent Donatien Behaghel, Montgeron (FR); Pascal Coat, Evry (FR); Arnaud Jean-Marie Pierrot, Le Mee sur Seine (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 910 days.

(21) Appl. No.: 12/200,311

(22) Filed: Aug. 28, 2008

(65) Prior Publication Data
US 2009/0056302 A1 Mar. 5, 2009

(30) Foreign Application Priority Data
Aug. 30, 2007 (FR) .................................... 07 06071

(51) Int. Cl.
*F02K 3/02* (2006.01)
*F02C 7/08* (2006.01)
(52) U.S. Cl. ........................................ 60/226.1; 60/39.5
(58) Field of Classification Search ................. 60/226.1, 60/39.181, 39.183, 801, 795, 785, 782, 39.5
See application file for complete search history.

(56) References Cited

U.S. PATENT DOCUMENTS

| 3,879,945 A * | 4/1975 | Summers ......................... 60/522 |
| 6,672,063 B1 * | 1/2004 | Proeschel ........................ 60/616 |

FOREIGN PATENT DOCUMENTS

| DE | 30 31 872 A1 | 4/1982 |
| DE | 32 34 679 A1 | 6/1983 |
| EP | 0 638 715 A1 | 2/1995 |
| FR | 2 723 987 | 3/1996 |
| JP | 1-151724 | 6/1989 |

* cited by examiner

*Primary Examiner* — Ehud Gartenberg
*Assistant Examiner* — Gerald Sung
(74) *Attorney, Agent, or Firm* — Oblon, Spivak, McClelland, Maier & Neustadt, L.L.P.

(57) ABSTRACT

A dual-flow turbomachine (10), essentially comprising a fan (14), a compressor (20), a combustion chamber (21), a turbine (22) and an exhaust casing (24), which comprises an auxiliary air compressor (48) driven by a Stirling engine (53) mounted downstream of the combustion chamber (21) and having a hot chamber in thermal contact with the flow (B) of hot gases leaving the turbine and a cold chamber in thermal contact with a flow (A) of cold gases generated by the fan (14) and flowing around the turbine (22) and the exhaust casing (24).

8 Claims, 2 Drawing Sheets

COMPONENT VENTILATION AND PRESSURIZATION IN A TURBOMACHINE

BACKGROUND OF THE INVENTION

The present invention relates to dual-flow turbomachines, such as airplane jet engines.

DESCRIPTION OF THE PRIOR ART

In a turbomachine, it is commonplace to tap energy to operate units of the turbomachine. Energy tapping is, for example, provided to drive a fuel pump, the actuator or computer supply, or even to pressurize oil chambers. In the case of an airplane jet engine, additional tapping arrangements are normally made, for example for the supply of electricity on board, the power supply to actuators of the airplane such as control surfaces or even for the pressurization of the airplane passenger compartment.

Such energy tapping mainly consists in tapping air from the air flow circulating in the high-pressure compressor of the turbomachine, and in mechanical tapping arrangements on the high-pressure rotor of this turbomachine.

Now, these tapping arrangements entail additional work on the part of the compressor of the turbomachine, leading to an increase in its specific fuel consumption.

The main aim of the invention is to provide a simple, economical and effective solution to this problem, making it possible to reduce the specific fuel consumption of the turbomachines, and its subject is a turbomachine fitted with an energy source that makes it possible to at least partly avoid the abovementioned tapping arrangements.

SUMMARY OF THE INVENTION

To this end, it proposes a dual-flow turbomachine, essentially comprising a fan, a compressor, a combustion chamber, a turbine and an exhaust casing, wherein this turbomachine comprises an auxiliary air compressor driven by a Stirling engine mounted downstream of the combustion chamber and having a hot chamber in thermal contact with the flow of hot gases leaving the turbine and a cold chamber in thermal contact with a flow of cold gases generated by the fan and flowing around the turbine and the exhaust casing.

The Stirling cycle thermal engine, commonly called "Stirling engine", makes it possible to exploit the temperature difference between the flow of hot gases, or primary flow, leaving the turbine and the flow of cold gases, or secondary flow, generated by the fan, to produce mechanical energy. This type of energy is characterized by a very good efficiency of the order of 40%, by very good reliability and a long life.

The theoretical operating cycle of such an engine comprises four successive phases: an isochoric heating phase followed by an isothermic expansion phase for the working fluid in the hot chamber, then an isochoric cooling phase followed by an isothermic compression phase for the working fluid in the cold chamber.

The mechanical energy produced by the Stirling engine is used to drive an auxiliary air compressor intended to supply air under pressure to components of the turbomachine, so as to reduce the air tapping requirements on the flow of air circulating in the high-pressure compressor of this turbomachine.

In a preferred embodiment of the invention, the Stirling engine is fixed to the turbine casing or to the exhaust casing, which makes it possible to benefit from a large free space between the flow arteries of the primary and secondary flows for the housing of the Stirling engine and of the auxiliary compressor. This area becomes all the more appropriate as the temperature difference between the primary flow of hot gases and the secondary flow of cold gases is approximately 450 degrees therein at normal operating speed, which represents a thermal gradient that is sufficient to enable the Stirling engine to operate well.

According to another feature of the invention, the Stirling engine comprises a heat exchanger positioned in the flow of cold gases and a heat exchanger positioned in the flow of hot gases, these exchangers preferably comprising internal and/or external vanes.

These exchangers make it possible to maximize the exchanges of heat between the flow of cold gases, respectively of hot gases, and a working fluid contained in the Stirling engine, to optimize the efficiency of the latter.

In the preferred embodiment of the invention, the outlet of the auxiliary air compressor is linked to means of ventilating or pressurizing a component of the turbomachine via a pipe fitted with a controlled or autonomous two-position valve, connecting the component ventilation or pressurization means either to the outlet of the auxiliary compressor, or to means of tapping air from the compressor of the turbomachine.

Thus, when the turbomachine operates at low speed, the thermal gradient between the hot gases and the cold gases is insufficient to enable the Stirling engine to operate well, and the cooling or the pressurization of the component of the turbomachine is ensured conventionally by tapping the flow of air from the compressor of the turbomachine. It is only when the speed reaches a level that is sufficient to enable the Stirling engine to operate well that the controlled valve switches over to its position connecting the ventilation or pressurization means to the outlet of the auxiliary compressor.

Advantageously, the valve is controlled by an electronic control block, for example based on a measurement of the temperature of the gases passing into the turbine.

As a variant, the valve is an autonomous check valve calibrated to the pressure level required for the cooling and pressurization of the turbomachine.

BRIEF DESCRIPTION OF THE DRAWINGS

The invention will be better understood, and other details, advantages and features of the latter will become more clearly apparent, from reading the following description given by way of nonlimiting example, with reference to the appended drawings in which.

DESCRIPTION OF THE PREFERRED EMBODIMENTS

Figure 1:
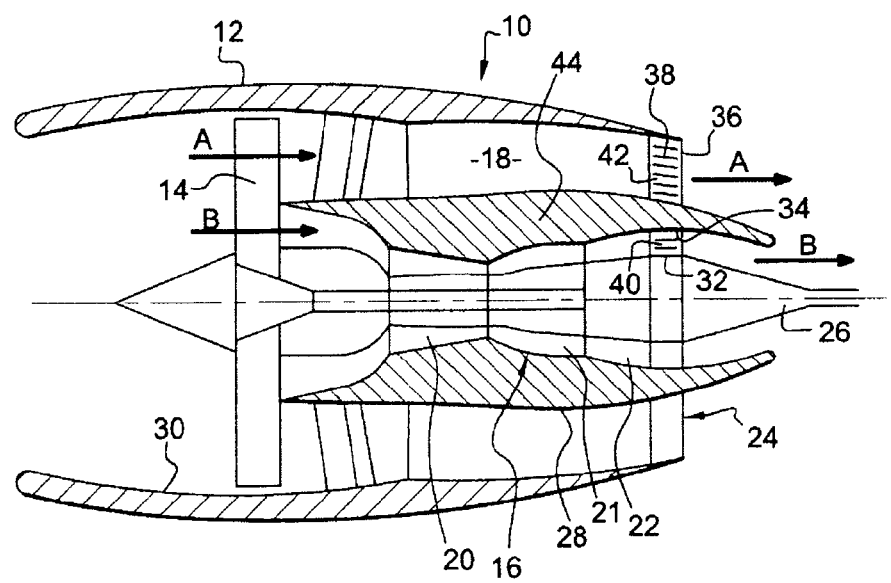
FIG. 1 is a diagrammatic view in axial cross section of a turbomachine according to the invention.

FIG. 1 represents a dual-flow jet engine 10, comprising a nacelle 12 in which a fan wheel 14 is mounted upstream of an engine body 16 essentially comprising, from upstream to downstream, a compressor 20, a combustion chamber 21, a turbine 22, an exhaust casing 24 and an ejection cone 26.

The fan wheel 14 is driven rotation-wise by the turbine 22 of the jet engine, in a manner well known to those skilled in the art. While the engine is operating, the fan 14 generates a secondary flow of air A, which flows toward the back around the jet engine in a fan duct 18, and which supplies a part of the thrust of the engine. A portion of the air entering into the engine forms a primary flow B which feeds the inlet compressor 20 of the jet engine, then is mixed with fuel in the fuel chamber 21. The combustion gases leaving the combustion chamber drive the turbine 22 then are ejected between two coaxial walls 32, 34 of the exhaust casing 24 and leave the jet engine flowing along the ejection cone 26.

The fan duct 18 comprises two substantially cylindrical coaxial walls, respectively inner 28 and outer 30. The internal wall 28 of the fan duct is generally called IFD (Inner Fan Duct) whereas the outer wall 30 is generally called OFD (Outer Fan Duct) and is surrounded by the nacelle 12.

The two coaxial walls, respectively inner 32 and outer 34, of the exhaust casing 24 are linked by structural radial arms 36.

Each radial arm 36 of the exhaust casing 24 links the coaxial walls 32, 34 of the casing to the cylindrical walls 28, 30 of the fan duct 18, so that a part 40 of the arm 36 intercepts the primary flow B whereas another part 42 of this arm intercepts the secondary flow A.

The radial arm 36 that can be seen in the top half of FIG. 1 comprises a beta-type Stirling cycle engine. This engine comprises, conventionally, a hot chamber and a cold chamber which are linked for the circulation of a working fluid contained in these chambers and moved from one chamber to the other by the movement of a displacing piston.

The hot chamber is positioned in the part 40 of the arm 36 which intercepts the primary flow B of hot air, whereas the cold chamber is positioned in the part 42 of the arm 36 which intercepts the secondary flow A of cold air.

Vanes 38 are advantageously formed on the outer and/or inner surface of the radial arms 36 level with the parts 40 and 42 of these arms, in order to optimize the heat exchanges between the flow B of hot air and the working fluid contained in the hot chamber positioned in the part 40 of the radial arm on the one hand, and between the flow A of cold air and the working fluid contained in the cold chamber positioned in the part 42 of this arm on the other hand.

During its circulation in the cold and hot chambers, the working fluid describes a Stirling thermodynamic cycle consisting of four successive phases during which it is in turn cooled, compressed, heated then expanded, by driving a working piston in a straight line.

The displacing and working pistons are housed in a working chamber linked to the hot and cold chambers, and positioned in a space 44 commonly called "inter-artery", between the flow arteries of the primary B and secondary A flows, that is between the outer wall 34 of the exhaust casing and the inner wall 28 delimiting the fan duct, so that this working chamber is not in thermal contact with the primary and secondary flows. The working chamber could also be fixed to the radially inner face of the inner wall 32 of the exhaust casing, provided that the heat exchanges with the primary flow in contact with this wall 32 are limited by a thermal insulation means.

The working piston of the Stirling engine forms or drives a moving unit of an auxiliary air compressor, housed in the inter-artery space 44, and intended to feed air under pressure to the components of the turbomachine to handle, for example, their cooling or their pressurization.

Figure 2:
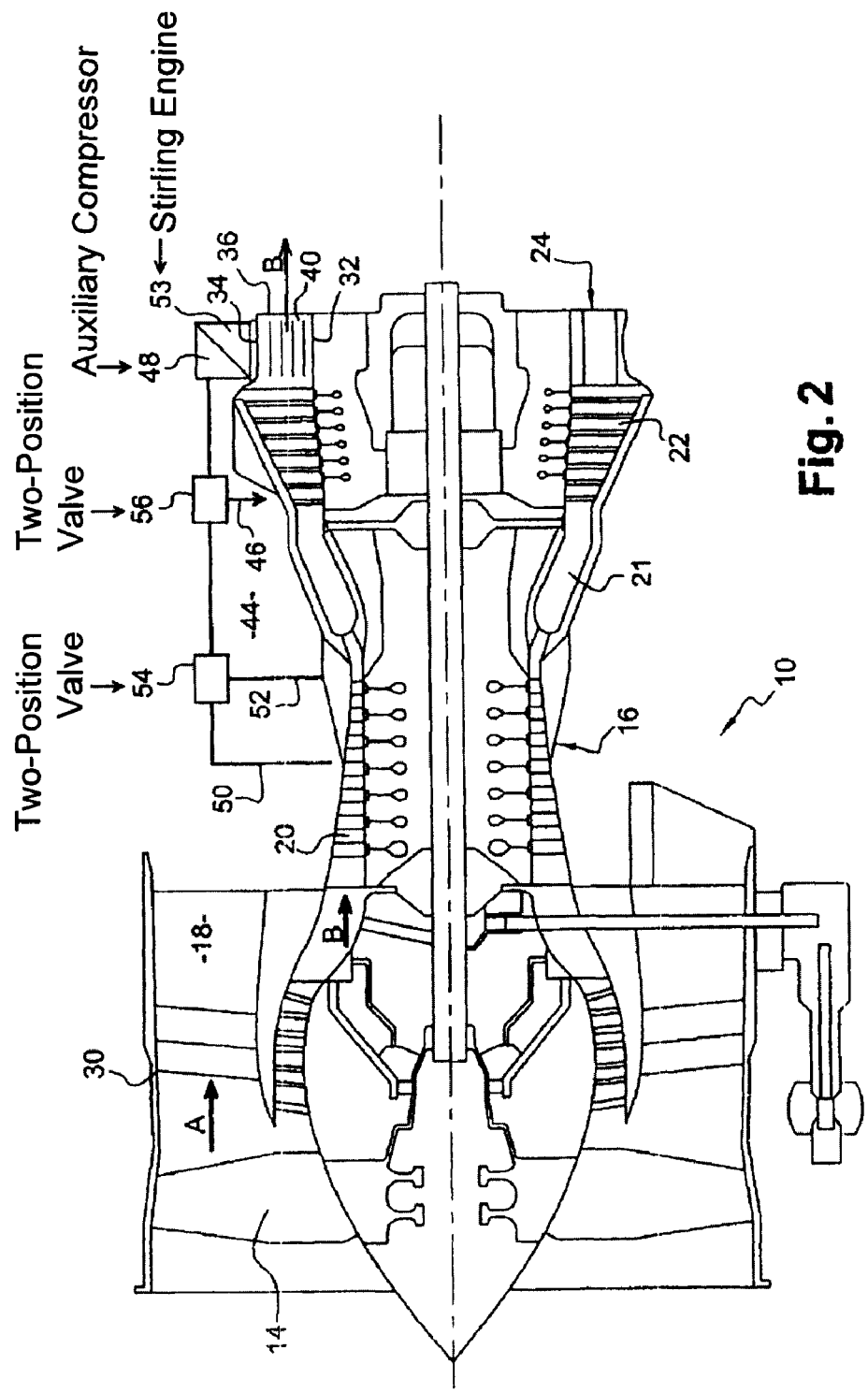
FIG. 2 is a diagrammatic view in axial cross section and on larger scale of the turbomachine of FIG. 1.

FIG. 2 diagrammatically represents the connection of the air outlet of the auxiliary compressor 48 to the inlet 46 of a circuit for distributing air under pressure (not visible) to components of the turbomachine.

Taps 50, 52 on the flow of air flowing in the high-pressure compressor 20 of the turbomachine are provided to feed the pressurized air distribution circuit during the operating phases of the jet engine where the temperature difference between the cold gases of the secondary flow A and the hot gases of the primary flow B is too small to enable the Stirling engine 53 to supply a mechanical power that is sufficient to drive the auxiliary compressor 48.

A two-position valve 54 makes it possible to alternately connect the inlet of the air distribution circuit to the tap 50 on the fourth stage of the high-pressure compressor 20, during the jet engine startup phases, and to the tap 52 on the ninth stage of the high-pressure compressor 20, at cruising speed as long as the thermal difference between the primary and secondary flows is not sufficient to enable the auxiliary compressor 48 to be driven by the Stirling engine or in case of failure of the Stirling engine or of the auxiliary compressor.

A two-position valve 56 is used to alternately connect the inlet of the air distribution circuit to the valve 54 when the jet engine is in one of the abovementioned operating situations, and to the auxiliary compressor 48 when the thermal difference between the primary and secondary flows reaches a threshold enabling the Stirling engine 53 to efficiently drive the auxiliary compressor 48.

The valves 54 and 56 are controlled by an electronic control block of FADEC type, based on measurements of temperature of the hot and cold gases flowing in the turbomachine, in the vicinity of the Stirling engine.

Alternatively, the valves could be controlled based on pressure measurements on the air delivered by the taps 50, 52 and by the auxiliary compressor 48.

The valves could also be autonomous, and calibrated to the pressure levels necessary to feed the pressurized air distribution circuit.

This air distribution circuit handles, for example, the pressurization of the bearing housing covers of the turbomachine, the ventilation of the first stage of a low-pressure distributor, the ventilation of rims of low-pressure turbine disks, and the purging of a cavity located downstream of a high-pressure turbine disk.

To do this, the auxiliary compressor 48 delivers a flow rate of approximately 1.5 kg/s of air at a relative pressure of the order of 0.3 bar at nominal operating speed. This compressor takes the form of a cylinder with a diameter of approximately 100 mm for approximately 120 mm of length.

Driving this compressor requires a mechanical power of approximately 10 kW to be transmitted to it by the Stirling engine, this engine overall taking the form of a cylinder with a diameter of approximately 100 mm for approximately 200 mm of length.

Generally, the invention therefore makes it possible to limit the use of taps on the air flow used for propulsion flowing in the compressor of the jet engine, thanks to an auxiliary compressor driven by a Stirling engine capable of converting the thermal energy contained in the primary flow of hot gases originating from the combustion chamber of the jet engine into mechanical energy.

The invention is obviously not limited to airplane jet engines but can be applied to any type of dual-flow turbomachine.

There is claimed:

1. A dual-flow turbomachine, essentially comprising a fan, a compressor, a combustion chamber, a turbine and an exhaust casing, wherein this turbomachine comprises an auxiliary air compressor driven by a Stirling engine mounted downstream of the combustion chamber and having a hot chamber in thermal contact with the flow of hot gases leaving the turbine and a cold chamber in thermal contact with a flow of cold gases generated by the fan and flowing around the turbine and the exhaust casing.

2. The turbomachine as claimed in claim 1, wherein the Stirling engine is fixed to the turbine casing or to the exhaust casing.

3. The turbomachine as claimed in claim 1, wherein the Stirling engine comprises a heat exchanger positioned in the flow of cold gases and a heat exchanger positioned in the flow of hot gases.

4. The turbomachine as claimed in claim 3, wherein the heat exchangers comprise internal and/or external vanes.

5. The turbomachine as claimed in claim 1, wherein the outlet of the auxiliary air compressor is linked to means of ventilating or pressurizing a component of the turbomachine via a pipe fitted with a controlled or autonomous two-position valve, connecting the component ventilation or pressurization means either to the outlet of the auxiliary compressor or to means of tapping air from the compressor of the turbomachine.

6. The turbomachine as claimed in claim 5, wherein the valve is controlled by the temperature of the gases passing into the turbine.

7. The turbomachine as claimed in claim 5, wherein the valve is controlled by an electronic control block.

8. The turbomachine as claimed in claim 5, wherein the valve is an autonomous check valve calibrated to the pressure level necessary for the ventilations and pressurizations of the turbomachine.

* * * * *